(12) United States Patent
Isono

(10) Patent No.: US 7,922,263 B2
(45) Date of Patent: Apr. 12, 2011

(54) BRAKING APPARATUS FOR VEHICLE

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 52 days.

(21) Appl. No.: 12/444,947

(22) PCT Filed: Dec. 27, 2007

(86) PCT No.: PCT/JP2007/075103
§ 371 (c)(1),
(2), (4) Date: Apr. 9, 2009

(87) PCT Pub. No.: WO2008/084712
PCT Pub. Date: Jul. 17, 2008

(65) Prior Publication Data
US 2010/0066162 A1   Mar. 18, 2010

(30) Foreign Application Priority Data

Dec. 28, 2006   (JP) ................................ 2006-355524

(51) Int. Cl.
B60T 8/34   (2006.01)
(52) U.S. Cl. .................................................. 303/114.1
(58) Field of Classification Search .................. 188/359;
303/113.1, 113.4, 114.1, 122.09, 122.13;
60/547.3, 550, 582
See application file for complete search history.

(56) References Cited

U.S. PATENT DOCUMENTS

| 5,168,791 | A | 12/1992 | Maehara et al. | |
|---|---|---|---|---|
| 7,077,482 | B2 * | 7/2006 | Matsuno et al. | 303/114.1 |
| 2003/0168909 | A1 | 9/2003 | Kusano | |
| 2004/0004392 | A1 * | 1/2004 | Kusano | 303/114.1 |
| 2004/0189087 | A1 * | 9/2004 | Kusano | 303/114.1 |
| 2004/0227396 | A1 * | 11/2004 | Kusano | 303/113.1 |

FOREIGN PATENT DOCUMENTS

| DE | 103 08 607 A1 | 10/2003 |
|---|---|---|
| EP | 0 506 222 A1 | 9/1992 |
| JP | 60 215459 | 10/1985 |
| JP | 4 135960 | 5/1992 |
| JP | 4 297365 | 10/1992 |
| JP | 2003 285730 | 10/2003 |
| JP | 2004 243983 | 9/2004 |
| JP | 2006 264359 | 10/2006 |

OTHER PUBLICATIONS

German Office Action for application No. 11 2007 002 668 5-21 mailed Nov. 26, 2010, with English translation.

* cited by examiner

Primary Examiner — Christopher P Schwartz
(74) Attorney, Agent, or Firm — Oblon, Spivak, McClelland, Maier & Neustadt, L.L.P.

(57) ABSTRACT

In a braking apparatus for a vehicle, an input piston and a pressurizing piston are movably supported inside a cylinder, thereby sectioning a first pressure chamber, a second pressure chamber, and a third pressure chamber, the second pressure chamber and the third pressure chamber communicating with each other through a communicating path. An ECU causes a control hydraulic-pressure that is adjusted by first and second liner valves to act on the second pressure chamber from the third pressure chamber, thereby assisting the pressurizing piston to enable to output control hydraulic-pressure from the first pressure chamber. A counterforce chamber whose volume decreases as the input piston moves forward is provided inside a cylinder, and a counterforce giving mechanism that can give an operation counterforce to a brake pedal through the input piston by deforming corresponding to decrease of the volume of the counterforce chamber is provided inside the input piston.

13 Claims, 2 Drawing Sheets

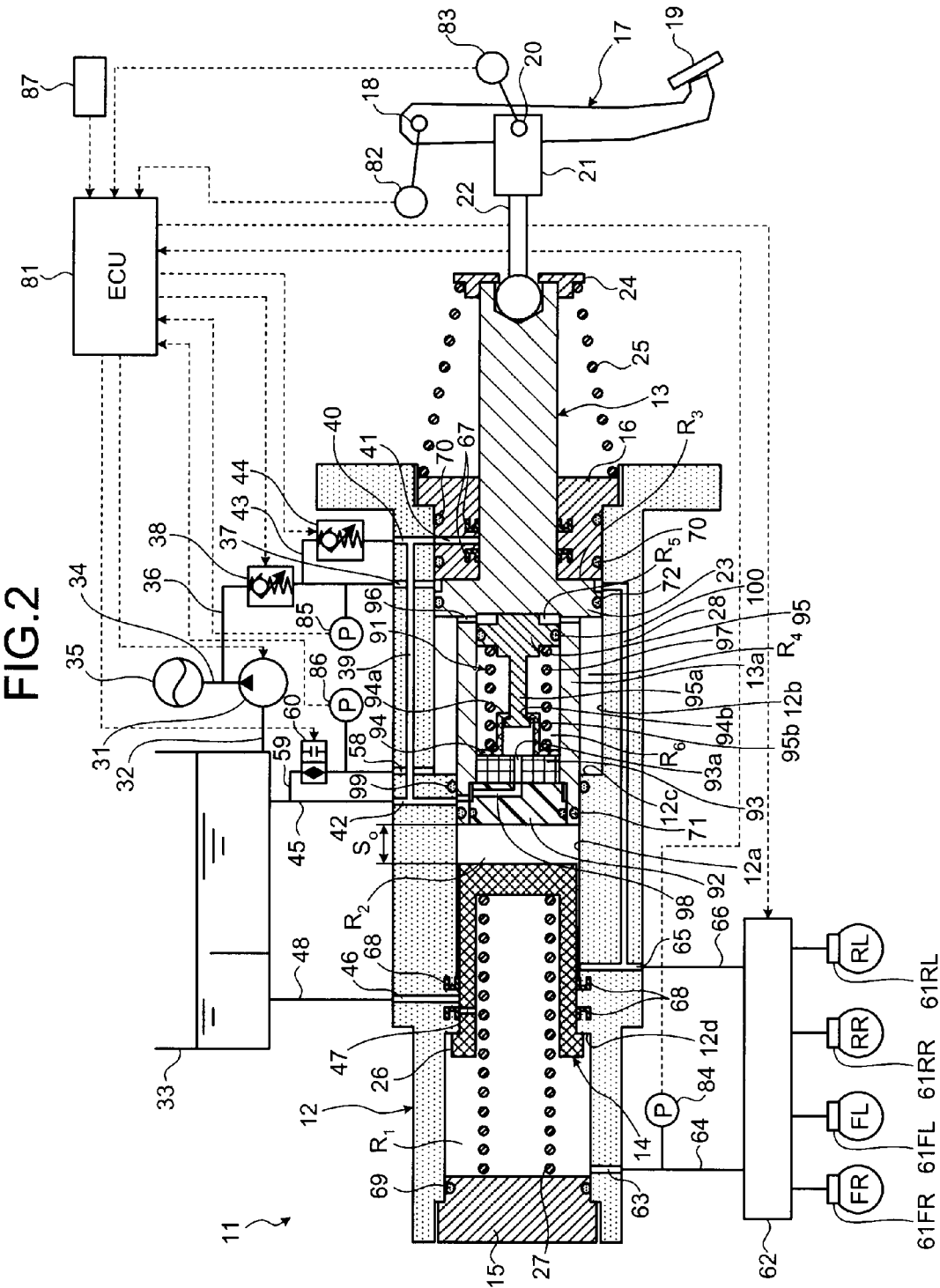

BRAKING APPARATUS FOR VEHICLE

TECHNICAL FIELD

The present invention relates to a braking apparatus for a vehicle that electronically controls a braking force to be given to a vehicle corresponding to a brake operation performed by a driver.

BACKGROUND ART

As a braking apparatus for a vehicle, an electronically-controlled braking apparatus has been known that electronically controls a braking force of a braking apparatus, that is, brake hydraulic pressure to be applied to wheel cylinders that drive this braking apparatus, corresponding to a brake operation amount (or an operating force) input through a brake pedal. As such a braking apparatus, for example, one disclosed in Patent Document 1 below is available.

In a braking apparatus for a vehicle disclosed in Patent Document 1, when a driver operates a brake pedal, a master cylinder generates hydraulic pressure corresponding to an operation amount. At the same time, a part of hydraulic oil flows into a stroke simulator, and an operating force of the brake pedal corresponding to pressure on the brake pedal is adjusted. Meanwhile, a targeted deceleration degree of the vehicle is set corresponding to a pedal stroke that is detected by a brake ECU, distribution of the braking force to respective wheels is determined, and predetermined hydraulic pressure is given to the respective wheels.

Patent Document 1: Japanese Patent Application Laid-Open No. 2004-243983

DISCLOSURE OF INVENTION

Problem to be Solved by the Invention

In the conventional braking apparatus for a vehicle described above, for the master cylinder that generates hydraulic pressure corresponding to an operation amount of the brake pedal, the stroke simulator that adjusts an operating force of the brake pedal upon receiving a part of the hydraulic oil flowed therein is provided. In addition, a pressurizing mechanism that pressurizes hydraulic oil to be supplied to four wheel cylinders on the master cylinder through a master cut valve is provided. Therefore, a coupling system of hydraulic pipes to connect an accumulator, the master cylinder, the stroke simulator, and the like becomes complicated, and there is a problem that manufacturing cost increases.

The present invention is achieved to solve such a problem, and it is an object of the present invention to provide a braking apparatus for a vehicle that is designed to achieve a simple configuration and low manufacturing cost.

Means for Solving Problem

To solve the problems as described above and to achieve an object, a braking apparatus for a vehicle according to the present invention includes an operating member with which a driver performs a brake operation; a driving piston that is supported movably in an axial direction in a cylinder and that can be moved forward by the operating member; a first pressure chamber and a second pressure chamber that are sectioned in a forward position and a backward position relative to the driving piston as a result that the driving piston is movably supported in the cylinder; a control-hydraulic-pressure setting unit that sets a control hydraulic-pressure corresponding to an operation made on the driving piston by the operating member; a hydraulic-pressure supply unit that generates a braking hydraulic-pressure from the first pressure chamber by causing the control hydraulic-pressure set by the control-hydraulic-pressure setting unit to act on the second pressure chamber; a counterforce chamber that is arranged in the cylinder and whose volume decreases as the driving piston moves forward; and a counterforce giving unit that is arranged in the driving piston, and that can give an operation counterforce to the operating member through the driving piston by deforming corresponding to decrease of volume of the counterforce chamber.

In the braking apparatus for a vehicle of the present invention, the driving piston includes an input piston and a pressurizing piston arranged in series inside the cylinder, an operating force of the operating member can be input to the input piston, the first pressure chamber is sectioned at a frontward position relative to the pressurizing piston, the second pressure chamber is sectioned between the pressurizing piston and the input piston, a third pressure chamber is sectioned in a rearward position relative to the input piston, and the second pressure chamber and the third pressure chamber communicate with each other through a communicating path.

In the braking apparatus for a vehicle of the present invention, the counterforce chamber is formed in a ring shape between the cylinder and the driving piston or the input piston, and the counterforce giving unit includes a counterforce piston that is movably supported inside the driving piston or the input piston to section a compression chamber, a communicating path that communicates the counterforce chamber and the compression chamber, and a biasing member that gives a bias in one direction to the counterforce piston to compress the compression chamber.

In the braking apparatus for a vehicle of the present invention, the counterforce piston is movably supported in the driving piston or the input piston to section the compression chamber and a decompression chamber, and the decompression chamber is configured such that air is released through a discharge path that is provided in the driving piston or the input piston.

In the braking apparatus for a vehicle of the present invention, the counterforce piston is movably supported in the driving piston or the input piston to section the compression chamber and a decompression chamber, and the decompression chamber is connected to a reserve tank through a discharge path.

In the braking apparatus for a vehicle of the present invention, the discharge path includes a first discharge path whose one end communicates with the decompression chamber by piercing through the driving piston or the input piston, a second discharge path whose one end communicates with another end of the first discharge path by piercing through the cylinder, and a third discharge path that connects the second discharge path and the reserve tank, and a sealing member to prevent leakage of hydraulic pressure from the discharge path is attached between the driving piston or the input piston and the cylinder.

EFFECT OF THE INVENTION

According to a braking apparatus of the present invention, a driving piston that can be moved by an operating member is movably supported inside a cylinder, thereby sectioning a first pressure chamber and a second pressure chamber. A hydraulic-pressure supply unit causes control hydraulic-pressure that is set by a control-hydraulic-pressure setting unit to act on the second pressure chamber, thereby being capable of generating a braking hydraulic-pressure from the first pressure chamber. A counterforce chamber whose volume decreases as the driving piston moves forward in the cylinder is provided, and a counterforce giving unit that can give an operation counterforce to the operating member through the driving piston by deforming corresponding to a volume decrease in the counterforce chamber is provided in the cylinder. Accordingly, the counterforce giving unit is incorporated in the cylinder, thereby simplifying hydraulic pressure pipes to be arranged outside the cylinder, and reducing manufacturing cost.

BRIEF DESCRIPTION OF DRAWINGS

FIG. 2 is a schematic configuration diagram of a braking apparatus for a vehicle according to a second embodiment of the present invention.

EXPLANATIONS OF LETTERS OR NUMERALS

Figure 1:
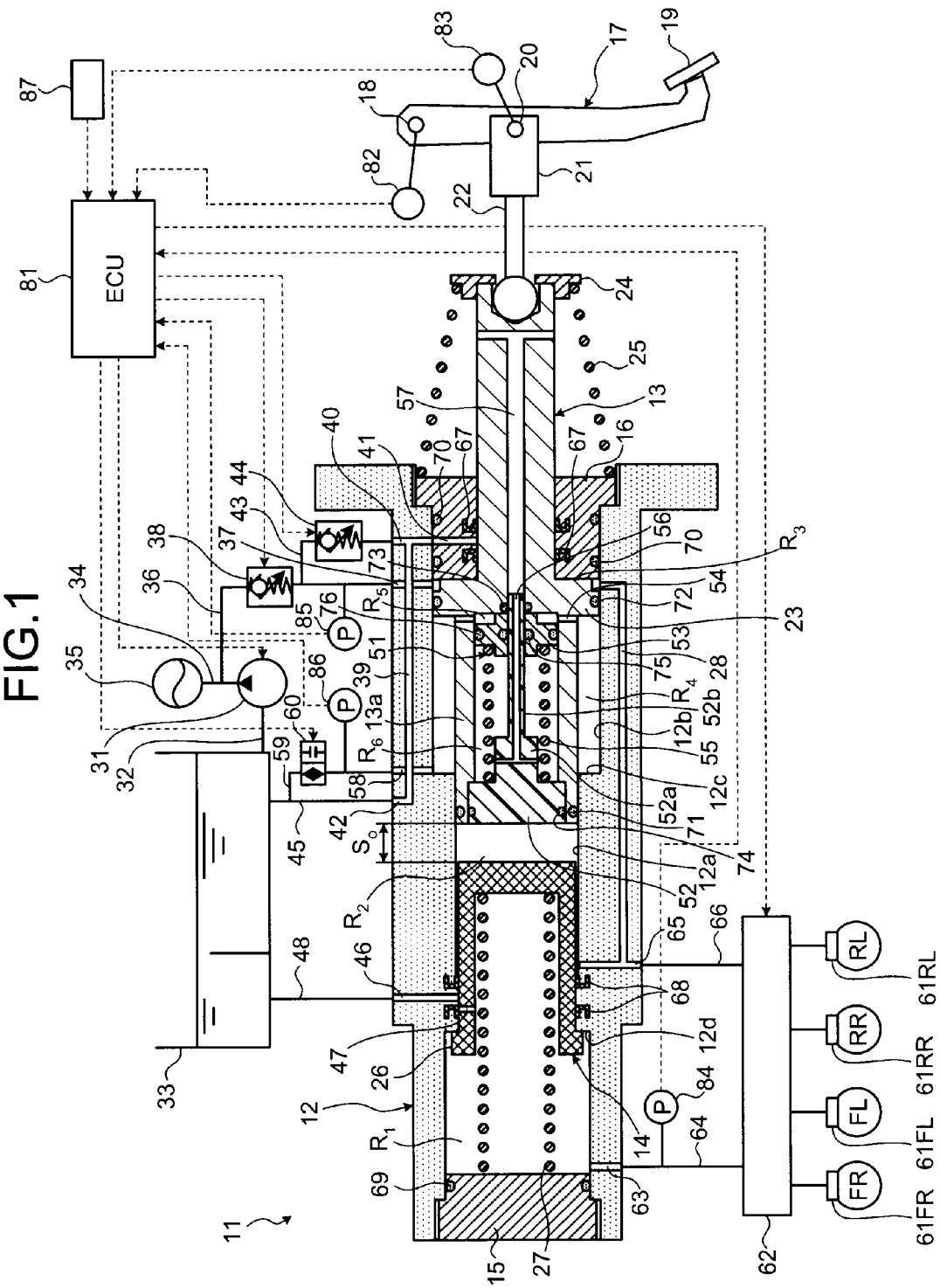
FIG. 1 is a schematic configuration diagram of a braking apparatus for a vehicle according to a first embodiment of the present invention.

11 MASTER CYLINDER
12 CYLINDER
13 INPUT PISTON
14 PRESSURIZING PISTON
17 BRAKE PEDAL (OPERATING MEMBER)
22 OPERATING ROD
25 COUNTERFORCE SPRING
27 BIAS SPRING
28 COMMUNICATING PATH
31 HYDRAULIC PRESSURE PUMP
33 RESERVE TANK
35 ACCUMULATOR
36 HYDRAULIC-PRESSURE SUPPLY PIPE
38 FIRST LINER VALVE
43 FIRST HYDRAULIC-PRESSURE DISCHARGE PIPE
44 SECOND LINEAR VALVE
45 SECOND HYDRAULIC-PRESSURE DISCHARGE PIPE
51, 91 COUNTERFORCE GIVING MECHANISM (COUNTERFORCE GIVING UNIT)
53, 95 COUNTERFORCE PISTON
54, 96 COMMUNICATING PATH
55, 97 BIAS SPRING
56, 98 FIRST DISCHARGE PATH
57 SECOND DISCHARGE PATH
59 HYDRAULIC-PRESSURE SUPPLY/DISCHARGE PIPE
60 ON/OFF VALVE
61FR, 61FL, 61RR, 61RL WHEEL CYLINDER
62 ABS
64 FIRST HYDRAULIC-PRESSURE DELIVERY PIPE
66 SECOND HYDRAULIC-PRESSURE DELIVERY PIPE
71, 99 O-RING (SEALING MEMBER)
81 ELECTRONIC CONTROL UNIT, ECU (CONTROL-HYDRAULIC-PRESSURE SETTING UNIT)
82 STROKE SENSOR
83 DEPRESSION SENSOR
84 FIRST PRESSURE SENSOR
85 SECOND PRESSURE SENSOR
86 THIRD PRESSURE SENSOR
93 RUBBER MEMBER
94 SUPPORT BRACKET
$R_1$ FIRST PRESSURE CHAMBER
$R_2$ SECOND PRESSURE CHAMBER
$R_3$ THIRD PRESSURE CHAMBER
$R_4$ COUNTERFORCE CHAMBER
$R_5$ COMPRESSION CHAMBER
$R_6$ DECOMPRESSION CHAMBER

BEST MODES FOR CARRYING OUT THE INVENTION

Embodiments of a braking apparatus for a vehicle according to the present invention are explained in detail below with reference to the accompanying drawings. The present invention is not limited by the embodiments.

First Embodiment

FIG. 1 is a schematic configuration diagram of a braking apparatus for a vehicle according to a first embodiment of the present invention.

In the braking apparatus for a vehicle according to the first embodiment, a master cylinder 11 is formed such that an input piston 13 and a pressurizing piston 14 as driving pistons are movably supported in an axial direction in a cylinder 12, as shown in FIG. 1. This cylinder 12 has a cylindrical shape in which a front end is closed and a rear end is open by such a configuration that a cap member 15 is fixed at the front end by screw (or press fit) while a support member 16 is fixed at the rear end by screw (or press fit). The input piston 13 and the pressurizing piston 14 are supported thereinside movably arranged in series in the axial direction.

As for a brake pedal 17 as an operating member, an upper end thereof is rotatably supported by a support axis 18 in an attachment bracket of a vehicle body not shown, and a pedal 19 that can be depressed by a driver by stepping thereon is attached at a lower end thereof. In the brake pedal 17, a clevis 21 is attached by a connecting shaft 20 at an intermediate part, and to this clevis 21, a rear end of an operating rod 22 is connected. A front end of the operating rod 22 of the brake pedal 17 is connected to a rear end of the input piston 13 arranged on a rear end side of the cylinder 12.

As for the input piston 13, an outer periphery thereof is movably supported by a small diameter portion 12a of the cylinder 12 and an inner periphery of the support member 16, and a flange 23 in a disc shape is movably supported by an inner periphery of a large diameter portion 12b. The input piston 13 is configured such that the stroke movement thereof is limited by the flange 23 abutting on a first stepped portion 12c and an end surface of the support member 16, and that the flange 23 is supported at a position at which the flange 23 abuts on the support member 16 in a pressed manner by a counterforce spring 25 that is strung between the support member 16 and a bracket 24 of the brake pedal 17.

The pressurizing piston 14 arranged on an end side of the cylinder 12 has a U-shaped cross-section, and an outer periphery thereof is movably supported by an inner periphery of the small diameter portion 12a of the cylinder 12. The pressurizing piston 14 is configured such that the stroke movement thereof is limited by a flange 26 abutting on the cap member 15 and a second stepped portion 12d of the cylinder 12, and that the pressurizing piston 14 is supported at a position at which the pressurizing piston 14 abuts on the second stepped portion 12d in a pressed manner by a bias spring 27 that is strung between the pressurizing piston 14 and the cap member 15. In this case, the input piston 13 and the pressurizing piston 14 are held in such a manner that the front end of the input piston 13 and the rear end of the pressurizing piston 14 are separated keeping a predetermined interval (stroke) $S_0$.

Accordingly, when a driver depresses the pedal 19 to turn the brake pedal 17, the operating force is transmitted to the input piston 13 through the operating rod 22. This input piston 13 can move forward against the force given by the counterforce spring 25. When the input piston 13 moves forward by an amount corresponding to the predetermined stroke $S_0$, the input piston 13 can abut on and press the pressurizing piston 14, and as a result, the input piston 13 and the pressurizing piston 14 can move forward in one unit against the force given by the bias spring 27.

By thus movably arranging the input piston 13 and the pressurizing piston 14 coaxially inside the cylinder 12, a first pressure chamber $R_1$ is formed in a forward direction (leftward in FIG. 1) of the pressurizing piston 14, a second pressure chamber $R_2$ is formed in a backward direction (rightward in FIG. 1) of the pressurizing piston 14, that is, between the input piston 13 and the pressurizing piston 14, and a third pressure chamber $R_3$ is formed in a backward direction (rightward in FIG. 1) of the input piston 13, that is between the input piston 13 and the support member 16. The second pressure chamber $R_2$ and the third pressure chamber $R_3$ communicate with each other through a communicating path 28.

A hydraulic pressure pump 31 can be driven by a not shown motor, and is connected to a reserve tank 33 through a pipe 32, as well as to an accumulator 35 through a pipe 34. Therefore, when the motor is driven, the hydraulic pressure pump 31 supplies hydraulic oil retained in the reserve tank 33 to the accumulator 35 through the pipes 32 and 34, to increase the pressure. The accumulator 35 can accumulate predetermined hydraulic pressure.

To the accumulator 35, one end of a hydraulic-pressure supply pipe 36 is connected, and the other end of this hydraulic-pressure supply pipe 36 is connected to a supply port 37 that is formed in the cylinder 12 so as to communicate with the third pressure chamber $R_3$ of the master cylinder 11. To this hydraulic-pressure supply pipe 36, a normally-closed type first liner valve 38 with which a flow rate can be controlled is attached. The first liner valve 38 functions to open a flow path of the hydraulic-pressure supply pipe 36 when electricity is supplied. In the input piston 13 of the master cylinder 11, a hydraulic-pressure discharge passage 39 is formed along a direction of length thereof. One end of this hydraulic-pressure discharge passage 39 opens to the outside of the cylinder 12, and communicates with first discharge ports 40 and 41 that pierce through the cylinder 12 and the support member 16 and open to the outer periphery of the input piston 13, while the other end communicates with a second discharge port 42 that opens to the outside of the cylinder 12. One end of a first hydraulic-pressure discharge pipe 43 is connected to the hydraulic-pressure supply pipe 36 on a side of the first supply port 37 relative to the first liner valve 38, and the other end is connected to the first discharge port 40. To this first hydraulic-pressure discharge pipe 43, a normally-open type second liner valve 44 with which a flow rate can be controlled is attached. The second liner valve 44 functions to close the hydraulic-pressure discharge pipe 43 when electricity is supplied. One end of a second hydraulic-pressure discharge pipe 45 is connected to the reserve tank 33, and the other end is connected to the second discharge port 42.

In the first pressure chamber $R_1$ of the master cylinder 11, communicating ports 46 and 47 that pierce through the cylinder 12 and the pressurizing piston 14 are formed, and these supplementary port communicating ports 46 and 47 are connected to the reserve tank 33 through a hydraulic-pressure communicating pipe 48.

Furthermore, a counterforce chamber $R_4$ is formed between the cylinder 12 and the input piston 13 as a result of movably supporting the input piston 13 inside the cylinder 12. This counterforce chamber $R_4$ is formed in a ring shape around the outer periphery of the input piston 13, and the volume thereof decreases as the input piston 13 moves forward (leftward movement in FIG. 1). In the input piston 13, a counterforce giving mechanism (counterforce giving unit) 51 is provided that can give an operation counterforce to the brake pedal 17 through the counterforce chamber $R_4$ and the input piston 13 by deformation made as a result of decrease of the volume of the counterforce chamber $R_4$.

A cylindrical portion 13a is formed at the end of the input piston 13 integrally with this counterforce giving mechanism 51, and a cap member 52 engages at an end of this cylindrical portion 13a, thereby forming a hollow shape. A pedestal 52a that projects inside the input piston 13 is formed integrally in the cap member 52, and a support rod 52b that extends along a center axis of the input piston 13 from this pedestal 52a is integrally formed. An end portion of this support rod 52b is engaged with the input piston 13. A counterforce piston 53 has a disc shape. At the central part thereof, the support rod 52b is pierced through, and an outer periphery thereof engages with the inner periphery of the input piston 13, thereby movably supported inside the input piston 13. By thus movably supporting the counterforce piston 53 inside the input piston 13, a compression chamber $R_5$ and a decompression chamber $R_6$ are sectioned. The counterforce chamber $R_4$ and the compression chamber $R_5$ communicate with each other through a communicating path 54 that is formed in the cylindrical portion 13a. In the decompression chamber $R_6$, a bias spring (biasing member) 55 is arranged between the pedestal 52a and the counterforce piston 53. The counterforce piston 53 functions to compress the compression chamber $R_5$ by applying a force in one direction by the bias spring 55.

Further, inside the support rod 52b of the cap member 52, a first discharge path 56 is formed, and one end of this first discharge path 56 pierces through the pedestal 52a and opens to the depression chamber $R_6$. Moreover, inside the input piston 13, a second discharge path 57 is formed, and one end of this second discharge path 57 opens to the outside of the cylinder 12, that is, atmosphere in a vehicle interior. The other end of the first discharge path 56 and the other end of the second discharge path 57 communicate with each other.

Furthermore, in the cylinder 12, a supply/discharge port 58 that communicates with the counterforce chamber $R_4$ is formed. A hydraulic-pressure supply/discharge pipe 59 is formed such that one end thereof is connected to the second hydraulic-pressure discharge pipe 45 and the other end is connected to the supply/discharge port 58. To this hydraulic-pressure supply/discharge pipe 59, an electromagnetic on/off valve 60 of a normally open type is attached, and this on/off valve 60 closes the hydraulic-pressure supply/discharge pipe 59 when electricity is supplied.

Accordingly, a stroke simulator serving as the counterforce giving mechanism 51 that can give an operation counterforce is arranged inside the input piston 13, thereby generating a pedal stroke corresponding to an operation amount of the brake pedal 17 by the driver to compress the counterforce chamber $R_4$. Thus, an operation counterforce is given to the driver through the brake pedal 17. Specifically, when the driver depresses the brake pedal 17, the operating force is transmitted to the input piston 13 through the operation rod 22, thereby moving the input piston 13 forward. Because the second hydraulic-pressure supply pipe 59 is closed by the on/off valve 60, the volume of the counterforce chamber $R_4$ decreases as a result of the forward movement of the input piston 13, and the hydraulic oil in the counterforce chamber $R_4$ flows into the compression chamber $R_5$ through the communicating path 54. The counterforce piston 53 moves against the force given by the bias spring 55. Meanwhile, the volume of the decompression chamber $R_6$ decreases and air thereinside is discharged to the atmosphere through the first discharge path 56 and the second discharge path 57. At this time, the hydraulic oil in the counterforce chamber $R_4$, the communicating path 54, and the compression chamber $R_5$ is compressed by an increased force of the bias spring 55 as a result of contraction thereof, to generate a force against the forward movement of the input piston 13, thereby enabling to give the operation counterforce to the brake pedal 17.

To front wheels FR and FL and rear wheels RR and RL, wheel cylinders 61FR, 61FL, 61RR, and 61RL that actuate a braking apparatus (not shown) are arranged, respectively, and the wheel cylinders 61FR, 61FL, 61RR, and 61RL can be activated by an ABS (antilock brake system) 62. Moreover, in the master cylinder 11, to a first delivery port 63 that communicates with the first pressure chamber $R_1$, a first hydraulic-pressure delivery pipe 64 is connected. This first hydraulic-pressure delivery pipe 64 is connected to an ABS 40 so that brake hydraulic pressure can be supplied to the wheel cylinders 61FR and 61FL of the front wheels FR and FL. On the other hand, to a second delivery port 65 that communicates with the second pressure chamber $R_2$, a second hydraulic-pressure delivery pipe 66 is connected. This second hydraulic-pressure delivery pipe 66 is connected to the ABS 62 so that brake hydraulic pressure can be supplied to the wheel cylinders 61RR and 61RL of the rear wheels RR and RL.

To the support member 16, a one-way seal 67 that seals a surface on which the input piston 13 slides is attached at frontward and backward positions of the first discharge port 41 to prevent leakage of hydraulic pressure. To the cylinder 12, a one-way seal 68 that seals a surface on which the pressurizing piston 14 slides is attached at frontward and backward positions of the second discharge port 46 to prevent leakage of hydraulic pressure.

Furthermore, to the cap member 15 and the support member 16, O-rings 69 and 70 that seal a surface with which the cylinder 12 engages are attached, to prevent leakage of hydraulic pressure. To the cylindrical portion 13a and the flange 23 of the input piston 13, O-rings 71 and 72 that seal a surface on which the cylinder 12 slides are attached, and to the input piston 13, an O-ring 73 that seals a surface at which the input piston 13 engages with the support rod 52b is attached, to prevent leakage of hydraulic pressure. To the cap member 52, an O-ring 74 that seals a surface at which the cap member 52 engages with the input piston 13 is attached to prevent leakage of hydraulic pressure. To the counterforce piston 53, O-rings 75 and 76 that seal a surface on which the support rod 52b and the cylindrical portion 13a slide are attached to prevent leakage of hydraulic pressure.

In the braking apparatus for a vehicle according to the present embodiment thus configured, an electronic control unit (ECU) 81 sets a target control hydraulic-pressure corresponding to an operating force (pedal depression) input to the input piston 13 from the brake pedal 17, and controls the first liner valve 38 and the second linear valve 44 based on the set target control hydraulic-pressure to give control hydraulic-pressure to the third pressure chamber $R_3$, and to give control hydraulic-pressure to the second pressure chamber $R_2$ through the communicating path 28, thereby assisting the pressurizing piston 14. Thus, the control hydraulic-pressure is given to each of the wheel cylinders 61FR, 61FL, 61RR, and 61RL from the pressure chamber $R_1$ in front and the second pressure chamber $R_2$ through the ABS 62, to apply braking force to the front wheels FR and FL and the rear wheels RR and RL.

Specifically, a stroke sensor 82 that detects a pedal stroke Sp of the brake pedal 17 and a depression sensor 83 that detects a depressing force Fp applied thereto are provided to the brake pedal 17, and respective detected results are output to the ECU 81. Moreover, a first pressure sensor 84 that detects braking hydraulic-pressure is provided to the first hydraulic-pressure delivery pipe 64. This first pressure sensor 84 detects braking hydraulic-pressure $P_M$ that is supplied to the wheel cylinders 61FR and 61FL of the front wheels FR and FL, and outputs a result of detection to the ECU 81. Furthermore, a second pressure sensor 85 is provided to the hydraulic-pressure supply pipe 36 on a side of the supply port 37 relative to the first liner valve 38. This second pressure sensor 85 detects control hydraulic-pressure $P_A$ that is obtained by adjusting hydraulic pressure from the accumulator 31 by the first liner valve 38, and outputs a result of detection to the ECU 81. Further, a third pressure sensor 86 is provided to the hydraulic-pressure supply/discharge pipe 59 on a side of the supply/discharge port 58 relative to the on/off valve 60. This third pressure sensor 86 detects counterforce hydraulic-pressure $P_R$ in the counterforce chamber $R_4$, and outputs a result of detection to the ECU 81. To each of the front wheels FR and FL and the rear wheels RR and RL, a wheel speed sensor 87 is provided, and outputs each detected wheel speed to the ECU 81.

Accordingly, the ECU 81 sets a target control hydraulic-pressure $P_{MT}$ based on the pedal stroke Sp of the brake pedal 17 detected by the stroke sensor 82, or the pedal depressing force Fp of the brake pedal 17 detected by the depression sensor 83, and adjusts the degree of opening of the first and the second liner valves 38 and 44. Meanwhile, the ECU 81 performs feedback on the braking hydraulic-pressure $P_M$ detected by the first pressure sensor 84, and controls so that the braking hydraulic-pressure $P_M$ agrees with the target control hydraulic-pressure $P_{MT}$. The ECU 81 has a map of the target control hydraulic-pressure $P_{MT}$ corresponding to the pedal stroke Sp or the pedal depressing force Fp, and controls each of the liner valves 38 and 44 based on this map. A value of the counterforce hydraulic-pressure $P_R$ to be given to the brake pedal 17 is obtained by adding a spring force of the counterforce spring 25 and a counterforce hydraulic-pressure $P_V$ that acts on the counterforce chamber $R_4$. The spring force is a fixed value determined by the specification of the spring, and the counterforce hydraulic-pressure $P_V$ that acts on the counterforce chamber $R_4$ is determined by the counterforce giving mechanism 51.

A braking force control performed by the braking apparatus for a vehicle according to the present embodiment thus configured is specifically explained. When a driver depresses the brake pedal 17, the input piston 13 moves forward corresponding to an operation amount or an operating force, and the pressurizing piston 14 moves forward in a state where the predetermined stroke $S_0$ is maintained. The hydraulic pressure in the second pressure chamber $R_2$ flows into the third pressure chamber $R_3$ through the communicating path 28, thereby making the input piston 13 free. Accordingly, the hydraulic pressure of the second pressure chamber $R_2$ is not to act as a counterforce on the brake pedal 17 through the input piston 13.

The stroke sensor 82 detects the pedal stroke Sp, and the depression sensor 83 detects the pedal depressing force Fp. The ECU 81 sets the target control hydraulic-pressure $P_{MT}$ based on the pedal stroke Sp or the pedal depressing force Fp. The ECU 81 then controls the first and the second linear valves 38 and 44 based on this target control hydraulic-pressure $P_{MT}$ to control the brake hydraulic-pressure of each of the wheel cylinders 61FR, 61FL, 61RR, and 61RL of the front wheels FR and FL and the rear wheel RR and RL.

Specifically, when a power system is working normally, the ECU 81 controls the first and the second liner valves 38 and 44 based on the target control hydraulic-pressure $P_{MT}$, thereby increasing or decreasing hydraulic pressure from the accumulator 31, and applies predetermined control hydraulic-pressure to the third pressure chamber $R_3$ through the hydraulic-pressure supply pipe 36 and the supply port 37. Accordingly, this control hydraulic-pressure passes through the communicating path 28 from the third pressure chamber $R_3$ and acts on the second pressure chamber $R_2$, the predetermined braking hydraulic-pressure $P_M$ acts on a second hydraulic-pressure delivery pipe 66 from a second delivery port 65, and the braking hydraulic-pressure $P_A$ acts on the second hydraulic-pressure delivery pipe 66 from the third pressure chamber $R_3$. Moreover, by the control hydraulic-pressure of the third pressure chamber $R_3$ acting on the second pressure chamber $R_2$ through the communicating path 28, the pressurizing piston 14 is assisted. As a result, the predetermined braking hydraulic-pressure $P_M$ acts on the first hydraulic-pressure delivery pipe 64 from the first pressure chamber $R_1$. At this time, the first pressure sensor 84 performs feedback of the detected braking hydraulic-pressure $P_M$, and the ECU 81 adjusts the opening degree of the first and the second linear valves 38 and 44 so that the braking hydraulic-pressure $P_M$ agrees with the target control hydraulic-pressure $P_{MT}$. Thus, this braking hydraulic-pressure $P_M$ and $P_A$ act on the wheel cylinders 61FR, 61FL, 61RR, and 61RL through the ABS 62, thereby generating a braking force corresponding to the operating force of the brake pedal 17 given by the driver on the front wheels FR and FL and the rear wheels RR and RL.

Furthermore, when the power system is working normally, because the hydraulic-pressure supply/discharge pipe 59 is closed by the on/off valve 60, in the counterforce giving mechanism 51, when the driver depresses the brake pedal 17, the input piston 13 moves forward to decrease the volume of the counterforce chamber $R_4$, and the hydraulic oil in the counterforce chamber $R_4$ flows into the compression chamber $R_5$ through the communicating path 54, the counterforce piston 53 moves against a force of the bias spring 55, and the volume of the decompression chamber $R_6$ decreases to discharge air thereinside to the atmosphere through the first discharge path 56 and the second discharge path 57. Therefore, the hydraulic oil in the counterforce chamber $R_4$, the communicating path 54, and the compression chamber $R_5$ is compressed by the bias spring 55 with a force increased as a result of contraction, to generate a force against the forward movement of the input piston 13, thereby giving an operation counterforce corresponding to the operating force of the brake pedal 17 made by the driver.

On the other hand, when a failure occurs in the power system and the system is damaged, the braking hydraulic-pressure to be given to each of the wheel cylinders 61FR, 61FL, 61RR, and 61RL cannot be controlled to be appropriate hydraulic-pressure by electrically controlling the first and the second liner valve 38 and 44 and the on/off valve 60. However, in the present embodiment, the first pressure chamber $R_1$ of the master cylinder 11 and the wheel cylinders 61FR and 61FL of the front wheels FR and FL are directly connected by the first hydraulic-pressure delivery pipe 64.

Therefore, when the power system is damaged, upon depression of the brake pedal 17 by the driver, the input piston 13 moves forward by an operating force thereof by the predetermined stroke $S_0$. The input piston 13 then abuts against the pressurizing piston 14, and the both pistons 13 and 14 move forward in one unit. Accordingly, the first pressure chamber $R_1$ is compressed and the hydraulic pressure of this first pressure chamber $R_1$ is put out to the first hydraulic-pressure delivery pipe 64. The hydraulic pressure put out to the first hydraulic-pressure delivery pipe 64 is to be given to the wheel cylinders 61FR and 61FL of the front wheels FR and FL as braking hydraulic-pressure, thereby generating a braking force corresponding to the operating force of the brake pedal 17 given by the driver on the front wheels FR and FL.

Furthermore, when the power system is damaged, because the on/off valve 60 is open and the hydraulic-pressure supply/discharge pipe 59 is released, in the counterforce giving mechanism 51, when the driver depresses the brake pedal 17, the input piston 13 moves forward to decrease the volume of the counterforce chamber $R_4$, and the hydraulic oil in the counterforce chamber $R_4$ is discharged to the reserve tank 33 through the hydraulic-pressure supply/discharge pipe 59, and therefore, such a state can be avoided that the brake pedal 17 does not work or that an operating force becomes needlessly heavy.

As described, in the braking apparatus for a vehicle according to the first embodiment, the input piston 13 and the pressurizing piston 14 are movably supported in series inside the cylinder 12, thereby sectioning the first pressure chamber $R_1$, the second pressure chamber $R_2$, and the third pressure chamber $R_3$. Meanwhile, the second pressure chamber $R_2$ and the third pressure chamber $R_3$ communicate with each other through the communicating path 28, and the ECU 81 causes the control hydraulic-pressure that is adjusted with the first and the second linear valves 38 and 44 to act on the second pressure chamber $R_2$ from the third pressure chamber $R_3$, to assist the pressurizing piston 14, thereby enabling the control hydraulic-pressure to be output from the first pressure chamber $R_1$. The counterforce chamber $R_4$ whose volume decreases according to the forward movement of the input piston 13 is provided in the cylinder 11, and the counterforce giving mechanism 51 that can give an operating force to the brake pedal 17 through the input piston 13 by deformation according to decrease of the volume of the counterforce chamber $R_4$ is provided.

Therefore, when the power system is in a normal state, the ECU 81 controls the first and the second linear valve 38 and 44 based on the target control hydraulic-pressure $P_{MT}$ to adjust hydraulic-pressure from the accumulator 31 and causes the hydraulic-pressure to act on the third pressure chamber $R_3$, and on the second pressure chamber $R_2$ through the communicating path 28. Thus, the pressurizing piston 14 is assisted so that the control hydraulic-pressure $P_M$ acts on the first hydraulic-pressure delivery pipe 64 from the first pressure chamber $R_1$, and so that the control hydraulic-pressure $P_A$ acts on the second hydraulic-pressure delivery pipe 66 from the second pressure chamber $R_2$. By causing the control hydraulic-pressure $P_M$ and the control hydraulic-pressure $P_A$ to act on each of the wheel cylinders 61FR, 61FL, 61RR, and 61RL, a braking force corresponding to the operating force of the brake pedal 17 made by the driver can be generated on the front wheels FR and FL and the rear wheel RR and RL.

At this time, in the counterforce giving mechanism 51, the volume of the counterforce chamber $R_4$ decreases as a result of the forward movement of the input piston 13, the hydraulic oil flows into the compression chamber $R_5$ through the communicating path 54, and the counterforce piston 53 moves against the force given by the bias spring 55. As a result, the hydraulic oil in the counterforce chamber $R_4$, the communicating path 54, and the compression chamber $R_5$ are compressed, to generate a force against the forward movement of the input piston 13, thereby giving an appropriate operation counterforce corresponding to the operating force given by the driver to the brake pedal 17. In addition, when the input piston 13 moves forward and the volume of the counterforce chamber $R_4$ decreases, and the hydraulic oil flows into the compression chamber $R_5$ through the communicating path 54, the volume of the decompression chamber $R_6$ decreases to discharge the air thereinside to the interior of the vehicle through the first discharge path 56 and the second discharge path 57. Accordingly, it becomes unnecessary to fill hydraulic oil in the decompression chamber $R_6$, and therefore, a failure caused by rust or the like of the counterforce giving mechanism 51 can be suppressed.

On the other hand, when there is a failure in the power system, the input piston 13 is caused to move forward by the operating force of the brake pedal 17 to abut against the pressurizing piston 14, to move both the pistons 13 and 14 forward in one unit so that the first pressure chamber $R_1$ is pressurized. The control hydraulic-pressure $P_M$ acts on the first hydraulic-pressure delivery pipe 64 from the first pressure chamber $R_1$, and this control hydraulic-pressure $P_M$ acts on each of the wheel cylinders 61FR, 61FL, 61RR, and 61RL, thereby generating a braking force corresponding to the operating force of the brake pedal given by the driver to the front wheel FR.

At this time, because the hydraulic-pressure supply/discharge pipe 59 is released by the on/off valve 60, in the counterforce giving mechanism 51, when the volume of the counterforce chamber $R_4$ decreases as a result of forward movement of the input piston 13, the hydraulic oil in the counterforce chamber $R_4$ is discharged to the reserve tank 33 through the hydraulic-pressure supply/discharge pipe 59. Therefore, such a state can be avoided that the brake pedal 17 does not operate or that an operating force becomes unnecessarily heavy, and action thereof can be improved.

Further, in the present embodiment, by incorporating the counterforce giving mechanism 51 in the master cylinder 11, hydraulic pressure pipes to be arranged outside the master cylinder 11 can be simplified, and as a result, manufacturing cost can be reduced.

As described in the present embodiment, when the power system is in a normal state, by controlling the first and the second linear valves 38 and 44 based on the target control hydraulic-pressure $P_{MT}$, a braking hydraulic-pressure corresponding to an operation of the brake pedal by a driver can be surely generated, and counterforce hydraulic-pressure can be surely generated by the counterforce giving mechanism 51. On the other hand, when there is a failure in the power system, by causing static pressure of the master cylinder 11 to act directly on the wheel cylinders 61FR and 61FL, a braking hydraulic-pressure corresponding to an operation of the brake pedal by a driver can be surely generated. As a result, the configuration can be simplified with a simple passage of hydraulic pressure, and the manufacturing cost can be reduced. In addition, an appropriate control of a braking force is enabled, thereby improving credibility and safety thereof.

Second Embodiment

FIG. 2 is a schematic configuration diagram of a braking apparatus for a vehicle according to a second embodiment of the present invention. Like reference characters refer to like parts that have similar functions as those explained in the embodiment described above, and duplicated explanation is omitted.

In the braking apparatus for a vehicle according to the second embodiment, the master cylinder 11 is formed such that the input piston 13 and the pressurizing piston 14 are movably supported in the cylinder 12, as shown in FIG. 2. In this cylinder 12, the cap member 15 is fixed at the front end while the support member 16 is fixed at the rear end. The input piston 13 and the pressurizing piston 14 are coaxially arranged in series thereinside. Further, the operating rod 22 of the brake pedal 17 is connected to the input piston 13.

The input piston 13 is configured such that the stroke movement thereof is limited by the flange 23 abutting on the first stepped portion 12c and the end surface of the support member 16, and that the flange 23 is supported at a position at which the flange 23 abuts on the support member 16 in a pressed manner by the counterforce spring 25. The pressurizing piston 14 is configured such that the stroke movement thereof is limited by the flange 26 abutting on the cap member 15 and the second stepped portion 12d of the cylinder 12, and that the pressurizing piston 14 is supported at a position at which the pressurizing piston 14 abuts on the second stepped portion 12d in a pressed manner by the bias spring 27. In this case, the input piston 13 and the pressurizing piston 14 are held in a separated manner keeping the predetermined interval (stroke) $S_0$.

Accordingly, when a driver depresses the brake pedal 17, the operating force is transmitted to the input piston 13 through the operating rod 22. This input piston 13 can move forward against the force given by the counterforce spring 25. When the input piston 13 moves forward by an amount corresponding to the predetermined stroke $S_0$, the input piston 13 can abut on the pressurizing piston 14, and as a result, the input piston 13 and the pressurizing piston 14 can move forward in one unit against the force given by the bias spring 27.

In the cylinder 12, the first pressure chamber $R_1$ is formed in a forward direction of the pressurizing piston 14, the second pressure chamber $R_2$ is formed in a backward direction of the pressurizing piston 14, that is, between the input piston 13 and the pressurizing piston 14, and the third pressure chamber $R_3$ is formed in a backward direction of the input piston 13, that is between the input piston 13 and the support member 16. The second pressure chamber $R_2$ and the third pressure chamber $R_3$ communicate with each other through the communicating path 28.

The hydraulic pressure pump 31 is connected to the reserve tank 33 through the pipe 32, as well as to the accumulator 35 through the pipe 34. The accumulator 35 is connected, through the hydraulic-pressure supply pipe 36, to the supply port 37 that communicates with the third pressure chamber $R_3$ of the master cylinder 11. To this hydraulic-pressure supply pipe 36, the first liner valve 38 is attached. In the input piston 13, the hydraulic-pressure discharge passage 39 is formed, and one end of this hydraulic-pressure discharge passage 39 communicates with the first discharge ports 40 and 41 that pierce through the cylinder 12 and the support member 16 in the direction of the diameter thereof, while the other end communicates with the second discharge port 42 that pierces in the direction of the diameter of the cylinder 12. The hydraulic-pressure supply pipe 36 is connected to the first discharge port 40 by the first hydraulic-pressure discharge pipe 43. To this first hydraulic-pressure discharge pipe 43, the second liner valve 44 is attached. Furthermore, the reserve tank 33 and the second discharge port 42 are connected by the second hydraulic-pressure discharge pipe 45. The communicating ports 46 and 47 that communicate with the first pressure chamber $R_1$ of the master cylinder 11 are connected to the reserve tank 33 through the hydraulic-pressure communicating pipe 48.

Furthermore, the counterforce chamber $R_4$ is formed by movably supporting the input piston 13 inside the cylinder 12. The volume of the counterforce chamber $R_4$ decreases as the input piston 13 moves forward. In the input piston 13, a counterforce giving mechanism (counterforce giving unit) 91 is provided that can give an operation counterforce to the brake pedal 17 through the counterforce chamber $R_4$ and the input piston 13 by deformation made as a result of decrease of the volume of the counterforce chamber $R_4$.

In this counterforce giving mechanism 91, a cap member 92 engages at an end of this cylindrical portion 13a, thereby forming a hollow shape of the input piston 13. Adjacent to this cap member 92, a rubber member 93 that has a ring shape having a through hole 93a at a center is arranged. Adjacent to this rubber member 93, a support bracket 94 that has a ring shape having a through hole 94b at a center of a projection 94a formed at a central portion thereof is arranged. A counterforce piston 95 has a disc shape. At the central part thereof, a support rod 95a that extends in a direction of the support bracket 94 is integrally formed. An end of this support rod 95a pierces through the through hole 94b of the support bracket 94, and is engaged with an engaging portion 95b. An outer periphery of this counterforce piston 95 engages with the inner periphery of the input piston 13, thereby movably supported inside the input piston 13. The counterforce piston 95 sections the compression chamber $R_5$ and the decompression chamber $R_6$. The counterforce chamber $R_4$ and the compression chamber $R_5$ communicate with each other through a communicating path 96 that is formed in the cylindrical portion 13a. In the decompression chamber $R_6$, a bias spring (biasing member) 97 is arranged between the support bracket 94 and the counterforce piston 95. The counterforce piston 95 functions to compress the compression chamber $R_5$ by being pressed in one direction by this bias spring 97.

Further, the decompression chamber $R_6$ is connected to the reserve tank 33 through a discharge path. Specifically, this discharge path is configured with a first discharge path 98 whose one end communicates with the decompression chamber $R_6$ through the through hole 93a of the rubber member 93 piercing through the cylindrical portion 13a of the input piston 13 and the cap member 92, the second discharge port 42 as a second discharge path whose one end communicates with the other end of the first discharge path 98 piercing through the cylinder 12, and the second hydraulic-pressure discharge pipe 45 as a third discharge path that connects the second discharge port 42 and the reserve tank 33.

Moreover, the supply/discharge port 58 of the counterforce chamber $R_4$ and the second hydraulic-pressure discharge pipe 45 are connected through the hydraulic-pressure supply/discharge pipe 59, and to this hydraulic-pressure supply/discharge pipe 59, the electromagnetic on/off valve 60 is attached.

Accordingly, with a stroke simulator serving as the counterforce giving mechanism 91 that can give an operation counterforce and that is arranged inside the input piston 13, a pedal stroke is generated corresponding to an operation amount of the brake pedal 17 by the driver to compress the counterforce chamber $R_4$, thereby giving an operation counterforce to the driver through the brake pedal 17. Specifically, when the driver depresses the brake pedal 17, the operating force is transmitted to the input piston 13 through the operation rod 22, thereby moving the input piston 13 forward. Because the second hydraulic-pressure supply pipe 59 is closed by the on/off valve 60, the volume of the counterforce chamber $R_4$ decreases as a result of the forward movement of the input piston 13, and the hydraulic oil in the counterforce chamber $R_4$ flows into the compression chamber $R_5$ through the communicating path 96. The counterforce piston 95 moves against the force given by the bias spring 97. Meanwhile, the volume of the decompression chamber $R_6$ decreases and hydraulic oil thereinside is discharged to the reserve tank 33 through the through holes 94b and 93a, the first discharge path 98, the second discharge port 42, and the second hydraulic-pressure discharge pipe 45. At this time, the hydraulic oil in the counterforce chamber $R_4$, the communicating path 96, and the compression chamber $R_5$ is compressed by an increased force of the bias spring 97 as a result of contraction thereof, to generate a force against the forward movement of the input piston 13, thereby giving the operation counterforce to the brake pedal 17.

To the front wheels FR and FL and the rear wheels RR and RL, the wheel cylinders 61FR, 61FL, 61RR, and 61RL are arranged, and the wheel cylinders 61FR, 61FL, 61RR, and 61RL can be activated by the ABS 62. Moreover, in the master cylinder 11, to the first delivery port 63 that communicates with the first pressure chamber $R_1$, the first hydraulic-pressure delivery pipe 64 is connected. This first hydraulic-pressure delivery pipe 64 is connected to the wheel cylinders 61FR and 61FL of the front wheels FR and FL through the ABS 40. On the other hand, to the second delivery port 65 that communicates with the second pressure chamber $R_2$, the second hydraulic-pressure delivery pipe 66 is connected. This second hydraulic-pressure delivery pipe 66 is connected to the wheel cylinders 61RR and 61RL of the rear wheels RR and RL through the ABS 62.

To the cylindrical portion 13a and the flange 23 of the input piston 13, the O-rings 71 and 72 that seal a surface on which the cylinder 12 slides are attached, and to the cylinder 12, the O-ring 99 that seals a surface on which the input piston 13 slides is attached. These O-rings 71 and 99 are arranged at a position at which the O-rings 71 and 99 sandwiches the first discharge path 98 and the second discharge port 42 configuring the discharge path described above, and function as a sealing member of the present invention to prevent leakage of hydraulic pressure. To the counterforce piston 95, an O-ring 100 that seals a surface on which the counterforce piston 95 slides on the cylindrical portion 13a is attached to prevent leakage of hydraulic pressure.

In the braking apparatus for a vehicle according to the present embodiment thus configured, the electronic control unit (ECU) 81 sets a target control hydraulic-pressure corresponding to an operating force (pedal depression) input to the input piston 13 from the brake pedal 17, and controls the first liner valve 38 and the second linear valve 44 based on the set target control hydraulic-pressure to give control hydraulic-pressure to the third pressure chamber $R_3$, and to give control hydraulic-pressure to the second pressure chamber $R_2$ through the communicating path 28, thereby assisting the pressurizing piston 14. Thus, the control hydraulic-pressure is given to each of the wheel cylinders 61FR, 61FL, 61RR, and 61RL from the pressure chamber $R_1$ in front and the second pressure chamber $R_2$ through the ABS 62, to apply braking force to the front wheels FR and FL and the rear wheels RR and RL.

Specifically, the stroke sensor 82 that detects a pedal stroke Sp of the brake pedal 17 and the depression sensor 83 that detects the depressing force Fp applied thereto are provided to the brake pedal 17. Moreover, the first pressure sensor 84 that detects the braking hydraulic-pressure $P_M$ is provided to the first hydraulic-pressure delivery pipe 64. The second pressure sensor 85 that detects the braking hydraulic-pressure $P_A$ is provided to the hydraulic-pressure supply pipe 36. The third pressure sensor 86 that detects the counterforce hydraulic-pressure $P_R$ is provided to the hydraulic-pressure supply/discharge pipe 59. To each of the front wheels FR and FL and the rear wheels RR and RL, the wheel speed sensor 87 is provided.

Accordingly, the ECU 81 sets the target control hydraulic-pressure $P_{MT}$ based on the pedal stroke Sp of the brake pedal 17 detected by the stroke sensor 82, or the pedal depressing force Fp of the brake pedal 17 detected by the depression sensor 83, and adjusts the degree of opening of the first and the second liner valves 38 and 44. Meanwhile, the ECU 81 performs feedback on the braking hydraulic-pressure $P_M$ detected by the first pressure sensor 84, and controls so that the braking hydraulic-pressure $P_M$ agrees with the target control hydraulic-pressure $P_{MT}$. The ECU 81 has a map of the target control hydraulic-pressure $P_{MT}$ corresponding to the pedal stroke Sp or the pedal depressing force Fp, and controls each of the liner valves 38 and 44 based on this map. A value of the counterforce hydraulic-pressure $P_R$ to be given to the brake pedal 17 is obtained by adding a spring force of the counterforce spring 25 and a counterforce hydraulic-pressure $P_V$ that acts on the counterforce chamber $R_4$. The spring force is a fixed value determined by the specification of the spring, and the counterforce hydraulic-pressure $P_V$ that acts on the counterforce chamber $R_4$ is determined by the counterforce giving mechanism 51.

A braking force control performed by the braking apparatus for a vehicle according to the present embodiment thus configured is specifically explained. When a driver depresses the brake pedal 17, the input piston 13 moves forward corresponding to an operation amount or an operating force, and the pressurizing piston 14 moves forward in a state where the predetermined stroke $S_0$ is maintained. The hydraulic pressure in the second pressure chamber $R_2$ flows into the third pressure chamber $R_3$ through the communicating path 28, thereby making the input piston 13 free. Accordingly, the hydraulic pressure of the second pressure chamber $R_2$ is not to act as a counterforce on the brake pedal 17 through the input piston 13.

The stroke sensor 82 detects the pedal stroke Sp, and the depression sensor 83 detects the pedal depressing force Fp. The ECU 81 sets the target control hydraulic-pressure $P_{MT}$ based on the pedal stroke Sp or the pedal depressing force Fp. The ECU 81 then controls the first and the second linear valves 38 and 44 based on this target control hydraulic-pressure $P_{MT}$ to control the braking hydraulic-pressure of each of the wheel cylinders 61FR, 61FL, 61RR, and 61RL of the front wheels FR and FL and the rear wheel RR and RL.

Specifically, when a power system is working normally, the ECU 81 controls the first and the second liner valves 38 and 44 based on the target control hydraulic-pressure $P_{MT}$, thereby increasing or decreasing hydraulic pressure from the accumulator 31, and applies predetermined control hydraulic-pressure to the third pressure chamber $R_3$ through the hydraulic-pressure supply pipe 36 and the supply port 37. Accordingly, this control hydraulic-pressure passes through the communicating path 28 from the third pressure chamber $R_3$ and acts on the second pressure chamber $R_2$, the predetermined braking hydraulic-pressure $P_M$ acts on the second hydraulic-pressure delivery pipe 66 from the second delivery port 65, and the predetermined braking hydraulic-pressure $P_A$ acts on the second hydraulic-pressure delivery pipe 66 from the third pressure chamber $R_3$. Moreover, the control hydraulic-pressure of the third pressure chamber $R_3$ acts on the second pressure chamber $R_2$ through the communicating path 28 to assist the pressurizing piston 14. As a result, the predetermined braking hydraulic-pressure $P_M$ acts on the first hydraulic-pressure delivery pipe 64 from the first pressure chamber $R_1$. At this time, the first pressure sensor 84 performs feedback of the detected braking hydraulic-pressure $P_M$, and the ECU 81 adjusts the opening degree of the first and the second linear valves 38 and 44 so that the braking hydraulic-pressure $P_M$ agrees with the target control hydraulic-pressure $P_{MT}$. Thus, this braking hydraulic-pressure $P_M$ and $P_A$ act on the wheel cylinders 61FR, 61FL, 61RR, and 61RL through the ABS 62, thereby generating a braking force corresponding to the operating force of the brake pedal 17 given by the driver on the front wheels FR and FL and the rear wheels RR and RL.

Furthermore, when the power system is working normally, because the hydraulic-pressure supply/discharge pipe 59 is closed by the on/off valve 60, in the counterforce giving mechanism 91, when the driver depresses the brake pedal 17, the input piston 13 moves forward to decrease the volume of the counterforce chamber $R_4$, and the hydraulic oil in the counterforce chamber $R_4$ flows into the compression chamber $R_5$ through the communicating path 96, the counterforce piston 95 moves against a force of the bias spring 97, and the volume of the decompression chamber R6 decreases to discharge hydraulic oil thereinside to the reserve tank 33 through the through holes 94b and 93a, the first discharge path 98, the second discharge port 42, and the second hydraulic-pressure discharge pipe 45. Therefore, the hydraulic oil in the counterforce chamber $R_4$, the communicating path 96, and the compression chamber $R_5$ is compressed by the bias spring 97 with a force increased as a result of contraction, to generate a force against the forward movement of the input piston 13, thereby giving an operation counterforce corresponding to the operating force of the brake pedal 17 made by the driver.

On the other hand, when a failure occurs in the power system and the system is damaged, when the driver depresses the brake pedal 17, the input piston 13 moves forward by an operating force thereof by the predetermined stroke $S_0$. The input piston 13 then abuts against the pressurizing piston 14, and the both pistons 13 and 14 move forward in one unit. Accordingly, the first pressure chamber $R_1$ is compressed and the hydraulic pressure of this first pressure chamber $R_1$ is put out to the first hydraulic-pressure delivery pipe 64. The hydraulic pressure put out to the first hydraulic-pressure delivery pipe 64 is to be given to the wheel cylinders 61FR and 61FL of the front wheels FR and FL as braking hydraulic-pressure, thereby generating a braking force corresponding to the operating force of the brake pedal 17 given by the driver on the front wheels FR and FL.

Furthermore, when the power system is damaged, because the on/off valve 60 is open and the hydraulic-pressure supply/discharge pipe 59 is released, in the counterforce giving mechanism 91, when the driver depresses the brake pedal 17, the input piston 13 moves forward to decrease the volume of the counterforce chamber $R_4$, and the hydraulic oil in the counterforce chamber $R_4$ is discharged to the reserve tank 33 through the hydraulic-pressure supply/discharge pipe 59, and therefore, such a state can be avoided that the brake pedal 17 does not work or that an operating force becomes needlessly heavy.

As described, in the braking apparatus for a vehicle according to the second embodiment, the input piston 13 and the pressurizing piston 14 are movably supported in series inside the cylinder 12, thereby sectioning the first pressure chamber $R_1$, the second pressure chamber $R_2$, and the third pressure chamber $R_3$. Meanwhile, the second pressure chamber $R_2$ and the third pressure chamber $R_3$ communicate with each other through the communicating path 28, and the ECU 81 causes the control hydraulic-pressure that is adjusted with the first and the second linear valves 38 and 44 to act on the second pressure chamber R₂ from the third pressure chamber R₃, to assist the pressurizing piston 14, thereby enabling the control hydraulic-pressure to be output from the first pressure chamber R₁. The counterforce chamber R₄ whose volume decreases according to the forward movement of the input piston 13 is provided in the cylinder 11, and the counterforce giving mechanism 91 that can give an operating force to the brake pedal 17 through the input piston 13 by deformation according to decrease of the volume of the counterforce chamber R₄ is provided in the input piston 13.

Therefore, when the power system is in a normal state, in the counterforce giving mechanism 91, the volume of the counterforce chamber R₄ decreases as a result of the forward movement of the input piston 13, the hydraulic oil flows into the compression chamber R₅ through the communicating path 96, and the counterforce piston 95 moves against the force given by the bias spring 97. As a result, the hydraulic oil in the counterforce chamber R₄, the communicating path 96, and the compression chamber R₅ are compressed, to generate a force against the forward movement of the input piston 13, thereby giving an appropriate operation counterforce corresponding to the operating force given by the driver to the brake pedal 17. In addition, when the input piston 13 moves forward and the volume of the counterforce chamber R₄ decreases, and the hydraulic oil flows into the compression chamber R₅ through the communicating path 96, the volume of the decompression chamber R₆ decreases to discharge the hydraulic oil thereinside to the reserve tank 33 through the through holes 94b and 93a, the first discharge path 98, the second discharge port 42, and the second hydraulic-pressure discharge pipe 45. Accordingly, by filling the hydraulic oil in the decompression chamber R₆, mixing of foreign substances can be suppressed and occurrence of failure can be suppressed.

On the other hand, when the power system is damaged, because the hydraulic-pressure supply/discharge pipe 59 is released by the on/off valve 60, in the counterforce giving mechanism 91, when the volume of the counterforce chamber R₄ decreases as a result of forward movement of the input piston 13, the hydraulic oil in the counterforce chamber R₄ is discharged to the reserve tank 33 through the hydraulic-pressure supply/discharge pipe 59. Therefore, such a state can be avoided that the brake pedal 17 does not operate or that an operating force becomes unnecessarily heavy, and action thereof can be improved.

Further, in the present embodiment, by incorporating the counterforce giving mechanism 91 in the master cylinder 11, hydraulic hydraulic-pressure pipes to be arranged outside the master cylinder 11 can be simplified, and as a result, manufacturing cost can be reduced.

While in the respective embodiments described above, the master cylinder 11 is configured by movably supporting the input piston 13 and the pressurizing piston 14 as driving pistons inside the cylinder 12, it can be configured by movably supporting a single driving piston inside a cylinder. In this case, a first pressure chamber and a second pressure chamber are sectioned in front and back in the direction of movement of the driving piston.

INDUSTRIAL APPLICABILITY

As described, with the braking apparatus for a vehicle according to the present invention, simplification of configuration and reduction of manufacturing cost are achieved by incorporating a counterforce giving means in a driving piston, and the present invention is suitably used for any kind of braking apparatus.

The invention claimed is:

1. A braking apparatus for a vehicle, comprising:
   an operating member with which a driver performs a brake operation;
   a driving piston that is supported movably in an axial direction in a cylinder and that can be moved forward by the operating member, the driving piston including an input piston and a pressurizing piston;
   a first pressure chamber and a second pressure chamber that are sectioned in a forward position and a backward position relative to the pressurizing piston as a result that the driving piston is movably supported in the cylinder;
   a control-hydraulic-pressure setting unit that sets a control hydraulic-pressure corresponding to an operation made on the driving piston by the operating member;
   a hydraulic-pressure supply unit that generates a braking hydraulic-pressure from the first pressure chamber by causing the control hydraulic-pressure set by the control-hydraulic-pressure setting unit to act on the second pressure chamber;
   a counterforce chamber that is arranged in the cylinder and whose volume decreases as the driving piston moves forward; and
   a counterforce giving unit that is arranged in the driving piston, and that can give an operation counterforce to the operating member through the driving piston by deforming corresponding to decrease of volume of the counterforce chamber, wherein
   the counterforce giving unit includes a compression chamber, a decompression chamber, and a counterforce piston provided between the compression chamber and the decompression chamber,
   the compression chamber communicates with the counterforce chamber, and
   the decompression chamber includes a biasing member that presses against the counterforce piston to compress the compression chamber.

2. The braking apparatus for a vehicle according to claim 1, wherein
   the counterforce chamber is formed in a ring shape between the cylinder and the driving piston, and
   the counterforce piston is movably supported inside the driving piston to section the compression chamber and a communicating path that communicates the counterforce chamber and the compression chamber.

3. The braking apparatus for a vehicle according to claim 2, wherein
   the counterforce giving unit is provided in the input piston and
   as the volume of the counterforce chamber is decreased by the driving piston, fluid from the counterforce chamber flows into the compression chamber via the communication path such that the fluid causes a volume of the compression chamber to increase and the counterforce piston to move against a bias force applied by the biasing member.

4. The braking apparatus for a vehicle according to claim 3, further comprising:
   a cap member at an end of the counterforce giving unit;
   a rubber member, adjacent to the cap member, that includes a first through hole at a center thereof; and
   a support bracket, adjacent to the rubber member, that has a ring shape and includes a second through hole at a center thereof.

5. The braking apparatus for a vehicle according to claim 4, wherein the counterforce piston includes a support rod that extends toward the support bracket such that a central part of the support rod pierces through the second through hole and an engaging portion of the support rod engages an inner periphery of the support bracket.

6. The braking apparatus for a vehicle according to claim 5, further comprising:
- a reserve tank; and
- a discharge path between the reserve tank and the decompression chamber,
- wherein the discharge path includes a first discharge path whose one end communicates with the decompression chamber through the first through hole and pierces through the input piston and the cap member, a second discharge path whose one end communicates with an other end of the first discharge path and that pierces through the cylinder, and a third discharge path that connects the second discharge path and the reserve tank.

7. The braking apparatus for a vehicle according to claim 6, wherein as the volume of compression chamber increases a volume of the decompression chamber decreases such that a discharge fluid within the decompression chamber is discharged to the reserve tank via the discharge path.

8. The braking apparatus for a vehicle according to claim 3, further comprising:
- a cap member at an end of the counterforce giving unit that includes a pedestal portion that projects inside the input piston and a support rod that extends along a center axis of the input piston from the pedestal portion, wherein
- the support rod includes a first discharge path that at one end opens to the decompression chamber via the pedestal portion, and
- the input piston includes a second discharge path that communicates with an other end of the first discharge path and that opens outside the cylinder.

9. The braking apparatus for a vehicle according to claim 8, wherein as the volume of compression chamber increases a volume of the decompression chamber decreases such that air within the decompression chamber is discharged outside of the cylinder via the first discharge path and the second discharge path.

10. The braking apparatus for a vehicle according to claim 1, wherein
- the input piston and the pressurizing piston are arranged in series inside the cylinder,
- an operating force of the operating member can be input to the input piston,
- the first pressure chamber is sectioned at a frontward position relative to the pressurizing piston,
- the second pressure chamber is sectioned between the pressurizing piston and the input piston,
- a third pressure chamber is sectioned in a rearward position relative to the input piston, and
- the second pressure chamber and the third pressure chamber communicate with each other through a communicating path.

11. A braking apparatus for a vehicle, comprising:
- an operating member with which a driver performs a brake operation;
- a driving piston that is supported movably in an axial direction in a cylinder and that can be moved forward by the operating member;
- a first pressure chamber and a second pressure chamber that are sectioned in a forward position and a backward position relative to the driving piston as a result that the driving piston is movably supported in the cylinder;
- a control-hydraulic-pressure setting unit that sets a control hydraulic-pressure corresponding to an operation made on the driving piston by the operating member;
- a hydraulic-pressure supply unit that generates a braking hydraulic-pressure from the first pressure chamber by causing the control hydraulic-pressure set by the control-hydraulic-pressure setting unit to act on the second pressure chamber;
- a counterforce chamber that is arranged in the cylinder and whose volume decreases as the driving piston moves forward; and
- a counterforce giving unit that is arranged in the driving piston, and that can give an operation counterforce to the operating member through the driving piston by deforming corresponding to decrease of volume of the counterforce chamber, wherein
- the counterforce chamber is formed in a ring shape between the cylinder and the driving piston or an input piston,
- the counterforce giving unit includes a counterforce piston that is movably supported inside the driving piston or the input piston to section a compression chamber, a communicating path that communicates the counterforce chamber and the compression chamber, and a biasing member that gives a bias in one direction to the counterforce piston to compress the compression chamber,
- the counterforce piston is movably supported in the driving piston or the input piston to section the compression chamber and a decompression chamber, and
- the decompression chamber is connected to a reserve tank through a discharge path.

12. The braking apparatus for a vehicle according to claim 11, wherein
- the discharge path includes a first discharge path whose one end communicates with the decompression chamber by piercing through the driving piston or the input piston, a second discharge path whose one end communicates with another end of the first discharge path by piercing through the cylinder, and a third discharge path that connects the second discharge path and the reserve tank, and
- a sealing member to prevent leakage of hydraulic pressure from the discharge path is attached between the driving piston or the input piston and the cylinder.

13. A braking apparatus for a vehicle, comprising:
- an operating member with which a driver performs a brake operation;
- a driving piston that is supported movably in an axial direction in a cylinder and that can be moved forward by the operating member;
- a first pressure chamber and a second pressure chamber that are sectioned in a forward position and a backward position relative to the driving piston as a result that the driving piston is movably supported in the cylinder;
- a control-hydraulic-pressure setting unit that sets a control hydraulic-pressure corresponding to an operation made on the driving piston by the operating member;
- a hydraulic-pressure supply unit that generates a braking hydraulic-pressure from the first pressure chamber by causing the control hydraulic-pressure set by the control-hydraulic-pressure setting unit to act on the second pressure chamber;
- a counterforce chamber that is arranged in the cylinder and whose volume decreases as the driving piston moves forward; and
- a counterforce giving unit that is arranged in the driving piston, and that can give an operation counterforce to the operating member through the driving piston by deforming corresponding to decrease of volume of the counterforce chamber, wherein the counterforce chamber is formed in a ring shape between the cylinder and the driving piston or an input piston, the counterforce giving unit includes a counterforce piston that is movably supported inside the driving piston or the input piston to section a compression chamber, a communicating path that communicates the counterforce chamber and the compression chamber, and a biasing member that gives a bias in one direction to the counterforce piston to compress the compression chamber, the counterforce piston is movably supported in the driving piston or the input piston to section the compression chamber and a decompression chamber, and the decompression chamber is configured such that air is released through a discharge path that is provided in the driving piston or the input piston.

* * * * *